United States Patent
Hofmann et al.

(10) Patent No.: US 7,328,216 B2
(45) Date of Patent: Feb. 5, 2008

(54) SYSTEM AND METHOD FOR PERSONALIZED SEARCH, INFORMATION FILTERING, AND FOR GENERATING RECOMMENDATIONS UTILIZING STATISTICAL LATENT CLASS MODELS

(75) Inventors: Thomas Hofmann, Barrington, RI (US); Jan Christian Puzicha, Albany, CA (US)

(73) Assignee: Recommind Inc., Berkeley, CA (US)

( * ) Notice: Subject to any disclaimer, the term of this patent is extended or adjusted under 35 U.S.C. 154(b) by 396 days.

(21) Appl. No.: 10/639,024

(22) Filed: Aug. 11, 2003

(65) Prior Publication Data
US 2004/0034652 A1 Feb. 19, 2004

Related U.S. Application Data

(63) Continuation of application No. 09/915,755, filed on Jul. 26, 2001, now Pat. No. 6,687,696.

(60) Provisional application No. 60/220,926, filed on Jul. 26, 2000.

(51) Int. Cl.
*G06F 17/30* (2006.01)
(52) U.S. Cl. ........................ 707/100; 707/101; 706/45
(58) Field of Classification Search ...................... None
See application file for complete search history.

(56) References Cited

U.S. PATENT DOCUMENTS

| | | | | |
|---|---|---|---|---|
| 4,348,740 A | * | 9/1982 | White | 709/253 |
| 4,839,853 A | * | 6/1989 | Deerwester et al. | 707/5 |
| 4,870,579 A | * | 9/1989 | Hey | 705/27 |
| 5,278,980 A | * | 1/1994 | Pedersen et al. | 707/4 |
| 5,301,109 A | * | 4/1994 | Landauer et al. | 704/9 |
| 5,675,819 A | * | 10/1997 | Schuetze | 704/10 |
| 5,704,017 A | | 12/1997 | Heckerman et al. | |
| 5,724,567 A | | 3/1998 | Ross et al. | |
| 5,790,426 A | | 8/1998 | Robinson | |
| 5,790,935 A | | 8/1998 | Payton | |
| 5,835,087 A | * | 11/1998 | Herz et al. | 715/810 |
| 5,867,799 A | | 2/1999 | Lang et al. | |

(Continued)

OTHER PUBLICATIONS

Eric Bloedorn, et al. Using NPL for Machine Learning of User Profiles. MITRE Corp. 1998.*

(Continued)

*Primary Examiner*—Neveen Abel-Jalil
(74) *Attorney, Agent, or Firm*—Hahn Loeser & Parks LLP; Michael H. Minns

(57) ABSTRACT

The system implements a novel method for personalized filtering of information and automated generation of user-specific recommendations. The system uses a statistical latent class model, also known as Probabilistic Latent Semantic Analysis, to integrate data including textual and other content descriptions of items to be searched, user profiles, demographic information, query logs of previous searches, and explicit user ratings of items. The system learns one or more statistical models based on available data. The learning may be reiterated once additional data is available. The statistical model, once learned, is utilized in various ways: to make predictions about item relevance and user preferences on un-rated items, to generate recommendation lists of items, to generate personalized search result lists, to disambiguate a users query, to refine a search, to compute similarities between items or users, and for data mining purposes such as identifying user communities.

19 Claims, 13 Drawing Sheets

U.S. PATENT DOCUMENTS

| | | | |
|---|---|---|---|
| 5,884,282 | A | 3/1999 | Robinson |
| 5,918,014 | A | 6/1999 | Robinson |
| 5,983,214 | A | 11/1999 | Lang et al. |
| 5,987,446 | A * | 11/1999 | Corey et al. .................. 707/3 |
| 6,006,218 | A | 12/1999 | Breese et al. |
| 6,029,141 | A | 2/2000 | Bezos et al. |
| 6,029,195 | A | 2/2000 | Herz |
| 6,041,311 | A | 3/2000 | Chislenko et al. |
| 6,049,777 | A | 4/2000 | Sheena et al. |
| 6,064,980 | A | 5/2000 | Jacobi et al. |
| 6,072,942 | A | 6/2000 | Stockwell et al. |
| 6,078,740 | A | 6/2000 | DeTreville |
| 6,138,116 | A | 10/2000 | Kitagawa et al. |
| 6,233,575 | B1 * | 5/2001 | Agrawal et al. ............... 707/6 |
| 6,349,309 | B1 * | 2/2002 | Aggarwal et al. ......... 707/200 |
| 6,356,864 | B1 * | 3/2002 | Foltz et al. .................... 704/1 |
| 6,493,702 | B1 | 12/2002 | Adar et al. |
| 6,510,406 | B1 | 1/2003 | Marchisio |
| 6,523,026 | B1 * | 2/2003 | Gillis ........................... 707/3 |
| 2002/0169730 | A1 * | 11/2002 | Lazaridis .................... 706/20 |

OTHER PUBLICATIONS

Henrik Fagrell et al. Make an Agent and you shall find. An Intranet Recommender System. Goteborg University, Sweden. 1999.*

Marko Balabanovic. An Adaptive Web Page Recommendation Service. ACM 1997.*

Nathaniel Good et al. Combining Collaborative Filtering with Personal Agents for Better Recommendations. AAAI. org. Copyright 1999.*

Chaomei Chen et al. From Latent Semantics to Spatial Hypertext- An Integrated Approach. HyperText98. Copyright ACM 1998.*

Michael J. Pazzani. A Framework for Collaborative, Content-Based and Demographic Filtering. Pub. 1999.*

Lyle H. Ungar and Dean P. Foster. Clustering Methods for Collaborative Filtering. AAAI 1998.*

Daniel Boley et al. Document Categorization and Query Generation on the World Wide Web Using WebACE. Pub. 1999.*

Christos H. Papadimitriou et al. Latent Semantic Indexing: A Probabilistic Analysis. Copyright ACM 1998.*

T. Hofmann and J. Puzicha, Statistical Models for Co-occurrence DataTechnical Report 1625, MIT, 1998.

S. Deerwester, S. T. Dumais, G. W. Furnas, T. K. Landauer and R. Harshman, Indexing by Latent Semantic Analysis, Journal of the American Society for Information Science, 1990.

T. Hofmann, Learning the Similarity of Documents: An Information-Geometric Approach to Document Retrieval and Categorization, Advances in Neural Information Processing Systems 12, pp. 914-920, MIT Press, Jun. 2000.

Patrick Baudisch, Joining Collaborative And Content-Based Filtering, CHI '99 Workshop: Interacting with Recommender Systems, 1999.

S.T. Dumais, Latent Semantic Indexing (LSI), Proceedings of the Text Retrieval conference (TREC-3)), pp. 219-230, 1995.

F. Pereira, N. Tishby and L. Lee, Distributional Clustering of English Words, Proceedings of the 31st Annual Meeting of the Association for Computational Linguistics, pp. 183-190, 1993.

M. Evans, Z. Gilula and I. Guttman, Latent Class Analysis of Two-Way Contingency Tables by Bayesian Methods, Biometrika, V. 76, No. 3, pp. 557-563, 1989.

Z. Gilula, S. Haberman, Canonical Analysis of Contingency Tables of Maximum Likelihood, Journal of the American Statistical Association, V. 81, No. 395, pp. 780-788, 1986.

T. Hofmann, J. Puzicha and M. I. Jordan, Learning from Dyadic Data, Advances in Neural Information Processing Systems vol. 11, MIT Press. 1999.

K. Rose, E. Gurewitz, and G. Fox, A Deterministic Annealing Approach To Clustering, Pattern Recognition Letters 11, pp. 589-594, 1990.

D. Lee and S. Seung Learning The Parts Of Objects By Non-Negative Matrix Factorization Nature, vol. 401, pp. 788-791 1999.

D. Gildea and T. Hofmann, Topic-Based Language Models Using EM, Proceedings of the 6th European Conference on Speech Communication and Technology (EUROSPEECH), 1999.

L. Saul and F. Pereira, Aggregate And Mixed-Order Markov Models For Statistical Language Processing, Proceedings of the 2nd International Conference on Empirical Methods in Natural Language Processing, 1997.

A. Rao, D. Miller, K. Rose, and A. Gersho, Deterministically annealed mixture of experts models for statistical regression, Proceedings of the IEEE International Conference on Acoustics, Speech, and Signal Processing, vol. 4, pp. 3201-3204, IEEE Comput. Soc. Press, 1997.

L. H. Ungar and D. P. Foster, Clustering Methods For Collaborative Filtering, AAAI Workshop on Recommendation Systems, 1998.

L. H. Ungar and D. P. Foster, A Formal Statistical Approach To Collaborative Filtering, Proceedings of Conference on Automated Leading and Discovery (CONALD), 1998.

L. D. Baker and A. K. McCallum, Distributional Clustering Of Words For Text Classification, SIGIR, 1998.

J. S. Breese, D. Heckerman, and C. Kadie, Empirical Analysis Of Predictive Algorithms For Collaborative Filtering, Proceedings of the Fourteenth Conference on Uncertainty in Artificial Intelligence, 1998.

D. Goldberg, D. Nichols, B. M. Oki, and D. Terry, Using Collaborative Filtering To Weave An Information Tapestry, Communications of the ACMV. 35, No. 12, pp. 61-70, 1992.

T. K. Landauer and S. T. Dumais, A Solution To Plato's Problem: The Latent Semantic Analysis Theory Of Acquisition, Induction, And Representation Of Knowledge, Psychological Review, V. 104, No. 2, pp. 211-240, 1997.

A. P. Dempster: N. M. Laird; and D. B. Rubin, Maximum likelihood from incomplete data via the EM algorithm, Journal Royal Statistical Society, V. 39, pp. 1-38, 1977.

* cited by examiner

|  | Keywords | Object | User |
|---|---|---|---|
| Keywords | Thesaurus | Information Retrieval / Filtering | Profile import / find experts / identify customers |
| Object | Indexing | Query by example / automated collaborative filtering | identify interested customers |
| User | Profile export | Active collaborative filtering | marketing / friend finder |

FIG. 1

| "segment 1" | "segment 2" | "matrix 1" | "matrix 2" | "line 1" | "line 2" | "power 1" | "power 2" |
|---|---|---|---|---|---|---|---|
| imag | speaker | robust | manufactur | constraint | alpha | POWER | load |
| SEGMENT | speech | MATRIX | cell | LINE | redshift | spectrum | memori |
| texture | recogni | eigenvalu | part | match | LINE | omega | vlsi |
| color | signal | uncertainti | MATRIX | locat | galaxi | mpc | POWER |
| tissue | train | plane | cellular | imag | quasar | hsup | systolic |
| brain | hmm | linear | famili | geometr | absorp | larg | input |
| slice | source | condition | design | impos | high | redshift | complex |
| cluster | speakerind. | perturb | machinepart | segment | ssup | galaxi | arrai |
| mri | SEGMENT | root | format | fundament | densiti | standard | present |
| volume | sound | suffici | group | recogn | veloc | model | implement |

Document 1, $P(z_k|d_1, w_j = \text{'segment'}) = (0.951, 0.0001, \ldots)$
$P(w_j = \text{'segment'}|d_1) = 0.06$ SEGMENT medic imag challeng problem field imag analysi diagnost base proper SEGMENT digit imag SEGMENT medic imag need applic involv estim boundari object classif tissu abnorm shape analysi contour detec textur SEGMENT despit exist techniqu SEGMENT specif medic imag remain crucial problem [...]

Document 2, $P\{z_k|d_2, w_j = \text{'segment'}\} = (0.025, 0.867, \ldots)$
$P\{w_j = \text{'segment'}|d_2\} = 0.010$ consid signal origin sequenc sourc specif problem SEGMENT signal relat SEGMENT sourc address issu wide applic field report describ resolu method ergod hidden markov model hmm hmm state correspond signal sourc signal sourc sequenc determin decod procedur viterbi algorithm forward algorithm observ sequenc baumweich train estim hmm paramet train materi applic multipl signal sourc identif problem experi perform unknown speaker identif [...]

FIG. 8

SYSTEM AND METHOD FOR PERSONALIZED SEARCH, INFORMATION FILTERING, AND FOR GENERATING RECOMMENDATIONS UTILIZING STATISTICAL LATENT CLASS MODELS This application is a continuation of application Ser. No. 09/915,755, filed Jul. 26, 2001, now U.S. Pat. No. 6,687,696, which claims the benefit of U.S. Provisional application No. 60/220,926, filed Jul. 26, 2000. Application Ser. Nos. 09/915,755 and 60/220,926 are hereby incorporated by reference.

TECHNICAL FIELD

The present invention relates generally to data processing systems and more specifically to a personalized search engine that utilizes latent class models called aspect models or Probabilistic Latent Semantic Analysis or Indexing.

BACKGROUND OF THE INVENTION

The rapid growth of digital data storage and the overwhelming supply of on-line information provided by today's communication networks creates a risk of constant information overload. One of the key problems of modern information society is the increasing difficulty in accessing relevant information while suppressing the overwhelming mass of irrelevant data. Most importantly, the notion of relevance is highly individual and thus difficult to formalize in general terms. Information Filtering refers to the general problem of separating useful and important information from nuisance data. Individual users have different preferences, opinions, judgments, tastes, and cultural backgrounds. In order to support different individuals in their quest for information, an automated filtering system has to take into account the diversity of preferences and the inherent relativity of information value.

One commonly distinguishes between (at least) two major approaches to information filtering. The first approach is content-based filtering in which information organization is based on properties of the object or the carrier of information. The second approach is collaborative filtering (or social filtering), in which the preference-behavior and qualities of other persons are exploited in speculating about the preferences of a particular individual. Information Filtering technology had a huge impact on the development of the Internet and the e-commerce boom.

Search engines are classical content-based systems based on pattern matching technology to quickly retrieve information based on query keywords. Search engines are fast and have proven to be scalable to data sets of the size of the Internet, but they have inherent limitations. Due to the simple nature of direct pattern matching they provide no understanding of the sense of a word and the context of its use, often resulting in an unexpected variety of search results. These results are typically explained by word matching, but are meaningless on the intentional level. Search engines typically are unable to effectively process over-specific queries where keywords are closely related to actual document content, yet do not appear in the actual text. Search engines are also frequently non-personalized, i.e., they provide the same results, independent of the user history, and they have no effective mechanism to learn from user satisfaction.

At the other end of the spectrum, E-commerce sites use recommender systems to suggest products to their customers. The products can be recommended based on the top overall sellers on a site, or on the demographics of the customer, or an analysis of the past buying behavior of the customer as a prediction for future buying behavior. Recommender systems aim at personalization on the Web, enabling individual treatment of each customer. However, recommender systems and their underlying collaborative filtering techniques have several shortcomings. Poor predictions at best can be made for new objects and new users ("Early rater problem"). In many domains, only a small percentage of possible items receive ratings for a given user ("Scarcity problem"). There are often users with different interests and tastes than any other users in the database ("Grey sheep problem"). More fundamentally, while many users may share some common interest, it may be extremely difficult to find a sufficient number of users that share all interests.

Therefore, in light of the foregoing deficiencies in the prior art, the applicant's invention is herein presented.

SUMMARY OF THE INVENTION

The disclosed system provides a method for the personalized filtering of information and the automated generation of user-specific recommendations. The system goes through 3 phases: 1) Information Gathering, 2) System Learning, and 3) Information Retrieval. The disclosed system is concerned primarily with the final two phases (System Learning and Information Retrieval). In the Information Gathering phase, information about the data to be retrieved (DOCUMENT DATA) and about the individual users (USER DATA) is collected. The USER DATA can be gathered explicitly through questionnaires, etc. or can be implied though observing user behavior such as Internet history logs, demographic information, or any other relevant sources of information. The DOCUMENT DATA can be gathered though a variety of methods including Internet crawling, topic taxonomies or any other relevant source of information. Once the Information Gathering phase is completed, the System Learning phase is initiated. The system employs a statistical algorithm that uses available USER DATA and DOCUMENT DATA to create a statistical latent class model (MODEL), also known as Probabilistic Latent Semantic Analysis (PLSA). The system learns one or more MODELS based on the USER DATA, DOCUMENT DATA, and the available database containing data obtained from other users. Within the MODEL, probabilities for words extracted from training data are calculated and stored in at least one matrix. An extended inverted index may also be generated and stored along with the MODEL in order to facilitate more efficient information gathering. The MODEL may be used in other applications such as the unsupervised learning of topic hierarchies and for other data mining functions such as identifying user communities. Various parts of the Information Gathering phase and the System Learning phase are repeated from time to time in order to further refine or update the MODEL. This refined or updated model will result in even higher levels of accuracy in processing the user's query. The final phase is the Information Retrieval phase. The user may enter a query. Once the query is entered into the system, the MODEL is utilized in calculating probabilities for every word in a document based upon at least 1) the user query, or 2) words associated with the users query in the MODEL, or 3) document information. All of the probabilities for a given document are added together yielding a total relevance "score" after which related documents are compared using this relevance score. The results are returned in descending order of relevance organized into at least one result list. Through the use of the MODEL, the system provides two benefits to the user: 1) the search results are personalized as each MODEL may be created in part using USER DATA, and 2) results for new users are somewhat personalized from the initial use through collaborative filtering based upon USER DATA for other system users.

SUMMARY OF THE DRAWINGS

FIG. 1 is a table showing possible queries in a combined content/collaborative system.

FIG. 7 is a table showing eight selected factors from a 128-factor decomposition along with their respective most probable words in the class-conditional distribution P(w|z), from top to bottom in descending order.

FIG. 8 is a graphical representation of abstracts of 2 exemplary documents from a cluster collection along with latent class posterior probabilities and word probabilities.

DETAILED DESCRIPTION OF THE INVENTION

Figure 3:
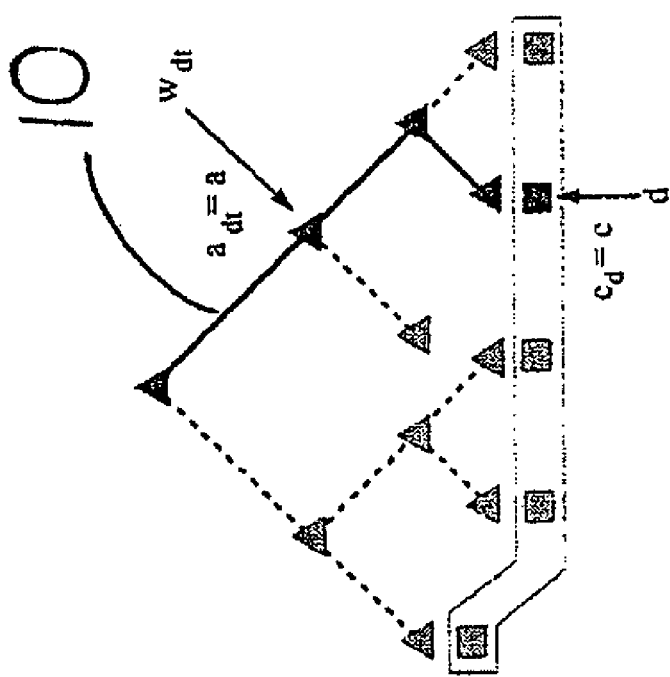
FIG. 3 is a schematic representation showing the assignment of occurrences to abstraction levels in terms of latent class variables.

The following detailed description sets forth preferred embodiments for a search engine. This description should not be interpreted as limiting the use of the invention to this particular application. Rather, the present invention may be utilized for various functions including information retrieval, data mining, as a recommender system, and to identify user communities. Further, reference is made to the accompanying drawings, figures and equations, which, in conjunction with this detailed description, illustrate and describe the search engine. The invention may be embodied in many different forms and should not be construed as limited only to the disclosed embodiments and equations.

Generally

The information available in typical information filtering applications is highly diverse. Thus, we are first concerned with abstracting away from this diversity in order to identify a few fundamental types of observation data. Co-occurrence data refers to a domain with two or more finite sets of objects in which observations are made for joint occurrences of objects, i.e., typically consist of tuples with one element from either set. This includes event dyadic data, histogram data, and single stimulus preference data as special cases. Co-occurrence data arises naturally in many applications ranging from computational linguistics and information retrieval to preference analysis and computer vision.

In online information filtering applications, we find three fundamental variables, namely objects (documents or products) $o \in O$, users or customers $u \in U$, and a vocabulary $w \in W$ of terms and descriptors. Here O, U and W are discrete spaces (i.e. the set of all objects, the set of all users and the underlying vocabulary) so observations can be modeled as co-occurrences of these basic variables, e.g. user queries as $(u; w_1, \ldots, w_n)$, object description $(o; w_1, \ldots, w_n)$, buying events $(u, o)$ etc.

More formally, our starting point is an observation sequence $S=(x_I^n)$, $1 \leq n \leq N$, which is a realization of an underlying sequence of random variables $(X_I^n)$, $1 \leq n \leq N$. Superscript indices are used to number observations. Capital letters without superscripts X are used to refer to generic instances of random variables with values in O, U or W, and $X_I$ refer to a generic co-occurrence where I is a multi-index for addressing the different co-occurring variables involved. In the modeling approach, it is assumed that the choice of a specific type of co-occurrence $I^n$ for the n-th observation is predetermined and is not part of the statistical model.

In this fashion, information filtering can be viewed in a statistical setting as completion of co-occurrences based on partial information, in essence the prediction of a response variable given a set of predictors. For example, a search engine functionality is modeled as predicting o given $w_1, \ldots, w_n$ or, in a statistical setting as computing the probability $P(o|w_1, \ldots, w_n)$ of observing o given the query terms. A recommender system is implemented by computing $P(o|u)$ while $P(o|u; w_1, \ldots, w_n)$ implements a personalized search engine. Several other possible applications seem reasonable. FIG. 1 is a table showing possible queries in a combined content/collaborative system (taken in part from Patrick Baudisch, Joining collaborative and content-based filtering. CHI'99 Workshop: Interacting with Recommender Systems, 1999.) FIG. 1 provides an overview of possible modalities in a combined content/collaborative system where the rows relate to a query and the columns relate to a target. The middle row 2 of FIG. 1 represents actual recommender functionality, where users are interested in retrieving objects. The last row 4 is of special interest for marketing applications, where users are to be identified.

The key problem in the statistical analysis of co-occurrence data is data sparseness. While counts $n(x_I)=|x_I^n: x_I^n=x_I|$ of the empirical frequency of an event $x_I$ capture all that can be possibly measured from the data, these sufficient statistics are subject to statistical fluctuations that for large underlying spaces and higher order co-occurrences become overwhelming, and therefore a direct estimation of joint occurrence probabilities becomes prohibitive.

In describing the invention, we follow three stages of describing Probabilistic Latent Semantic Analysis as the invented fundamental new principle for data analysis, prediction, and other applications.

First, we start with Probabilistic Latent Semantic Indexing which is the PROBABILISTIC LATENT SEMANTIC ANALYSIS realization for the case of only two types of observations, namely documents and words. It is thus used for classical information retrieval applications and indexing of document collections, hence the name. Probabilistic Latent Semantic Indexing has somewhat related to classical Latent Semantic Indexing, so the relationship is discussed in detail. We also discuss the relationship with distributional clustering, its most closely related statistical model that we are aware of.

Second, we then introduce the full, flat Probabilistic Latent Semantic Analysis model for generic multiway co-occurrence data that can be used, e.g. for joint collaborative and content filtering. While for the special case Probabilistic Latent Semantic Indexing several relationships to known proposals can be drawn, no competing approach is known for the full Probabilistic Latent Semantic Analysis method.

Finally, we address on how to extend the invention to hierarchical probabilistic models, which we call cluster-abstraction models. These are especially useful when data is inherently hierarchical and can be employed in many data mining tasks.

Probabilistic Latent Semantic Indexing

The starting point for Probabilistic Latent Semantic Indexing is a statistical model, which is also called (dyadic) aspect model. The aspect model is a latent variable model for co-occurrence data which associates an unobserved class variable $a \in A = \{a_1, \ldots, a_K\}$ with each observation. The modeling principle of latent variable models is the specification of a joint probability distribution for latent and observable variables. This unifies statistical modeling and structure detection: a probabilistic model of the observables is obtained by marginalization, while Bayes' rule induces posterior probabilities on the latent space of structures with respect to given observations. The latter provides a natural solution for topic extraction, word sense disambiguation and cataloging which correspond to different values of the hidden variables. As a key advantage, mixture models provide both, a parsimonious yet flexible parameterization of probability distributions with good generalization performance on sparse data, as well as structural information about data-inherent grouping structure, which is discussed in detail below in the section entitled 'The Cluster-Abstraction Model'. In the plain Probabilistic Latent Semantic Indexing model a joint probability model over O×W is defined by the mixture $$P(o, w) = P(o)P(w|o), \quad P(w|o) = \sum_{a \in A} P(w|a)P(a|o). \quad (1)$$

Figure 5:
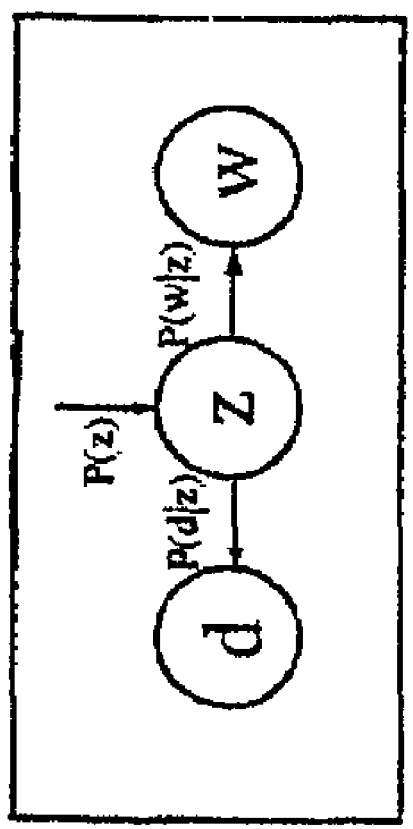
FIG. 5 is a graphical representation of the aspect model in the symmetric parameterization.
Figure 4:
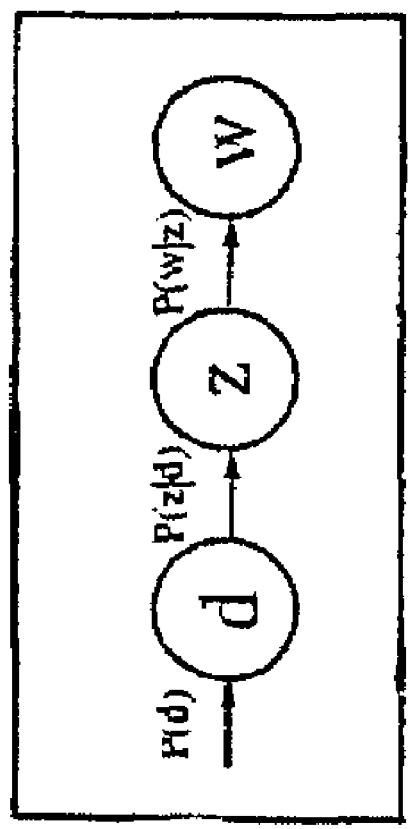
FIG. 4 is a graphical representation of the aspect model in the asymmetric parameterization.

The aspect model introduces a conditional independence assumption, namely that o and w are independent conditioned on the state of the associated latent variable. FIG. 4 is a graphical representation of the aspect model in the asymmetric parameterization. Since the cardinality of a is smaller than the number of documents/words in the collection, a acts as a bottleneck variable in predicting words. It is worth noticing that the model can be equivalently parameterized by $$P(o, w) = \sum_{a \in A} P(a)P(o|a)P(w|a) \quad (2)$$

which is perfectly symmetric in both entities, documents and words. FIG. 5 is a graphical representation of the aspect model in the symmetric parameterization.

The standard procedure for maximum likelihood estimation in latent variable models is the Expectation Maximization (EM) algorithm. Expectation Maximization alternates two coupled steps: (i) an expectation (E) step where posterior probabilities are computed for the latent variables, (ii) an maximization (M) step, where parameters are updated. Expectation Maximization is discussed in more detail in the section on multivariate aspect models. Standard calculations yield the E-step equation $$P(a|o, w) = \frac{P(a)P(o|a)P(w|a)}{\sum_{a' \in A} P(a')P(o|a')P(w|a')} \quad (3)$$

as well as the following M-step formulae $$P(w|a) \propto \sum_{o \in O} n(o, w)P(a|o, w), \quad (4)$$

$$P(o|a) \propto \sum_{w \in W} n(o, w)P(a|o, w), \quad (5)$$

$$P(a) \propto \sum_{o \in O} \sum_{w \in W} n(o, w)P(a|o, w). \quad (6)$$

Figure 6:
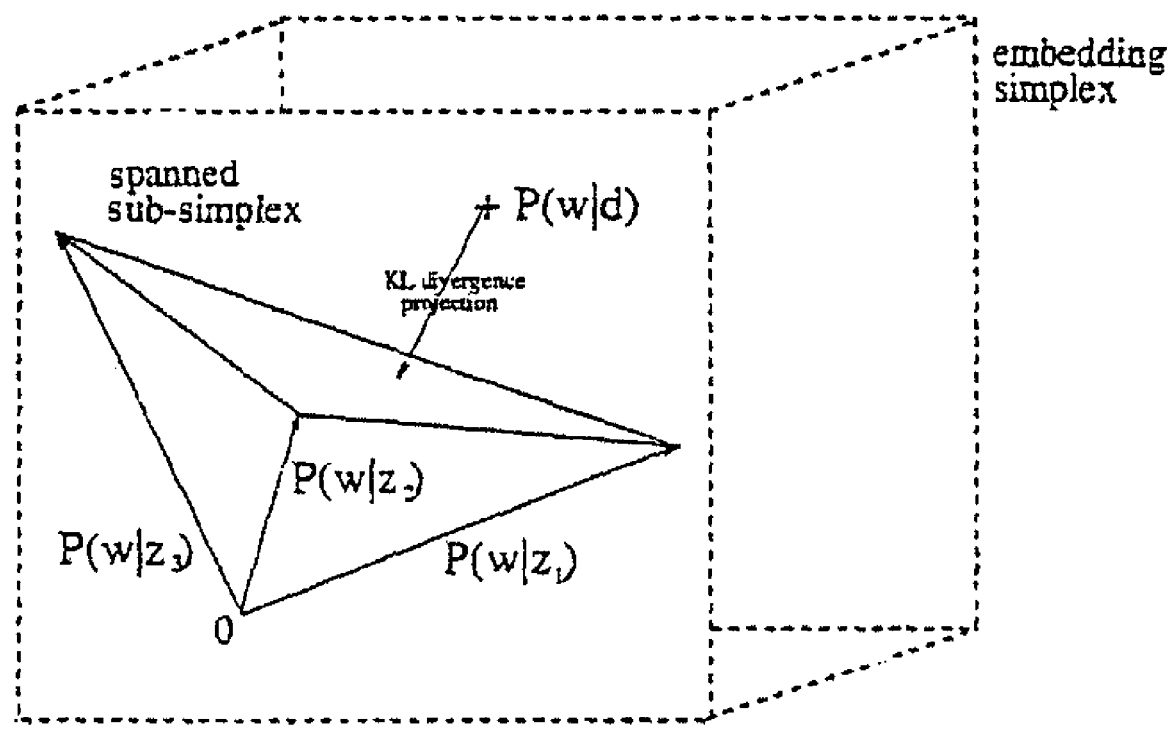
FIG. 6 is a graphical representation of the probability sub-simplex spanned by the aspect model.

Before discussing algorithmic refinements, we will study the relationship between the proposed model and the classical Latent Semantic Indexing in more detail. Consider the class-conditional multinomial distributions P(•|a) over the vocabulary which we call factors. They can be represented as points on the M−1 dimensional simplex of all possible multinomials. Via its convex hull, this set of K points defines a L≦K−1 dimensional sub-simplex. The modeling assumption expressed by equation (1) is that conditional distributions P(w|o) for all documents are approximated by a multinomial representable as a convex combination of factors P(w|a), where the mixing weights P(a|o) uniquely define a point on the spanned sub-simplex. FIG. 6 is a graphical representation of the probability sub-simplex spanned by the aspect model. Despite the discreteness of the introduced latent variables, a continuous latent space is obtained within the space of all multinomial distributions. Since the dimensionality of the sub-simplex is ≦K−1 as opposed to a maximum of M−1 for the complete probability simplex, this performs a dimensionality reduction in the space of multinomial distributions and the spanned sub-simplex can be identified with a probabilistic latent semantic space.

To stress this point and to clarify the relation to Latent Semantic Analysis, let us rewrite the aspect model as parameterized by equation (2) in matrix notation. Hence define matrices by $\hat{U} = (P(o_i|a_k))_{i,k}$, $\hat{V} = (P(w_j|a_k))_{j,k}$ and $\hat{\Sigma} = \text{diag}(P(Z_k))_k$. The joint probability model P can then be written as a matrix product $P = \hat{U}\hat{\Sigma}\hat{V}^t$. Comparing this with the Singular Value Decomposition UΣV' of the matrix n(o$_i$, w$_j$), as computed in Latent Semantic Indexing, one can make the following observations: (i) outer products between rows of $\hat{U}$ and $\hat{V}$ reflect conditional independence in Probabilistic Latent Semantic Indexing, (ii) the K factors correspond to the mixture components in the aspect model, and (iii) the mixing proportions in Probabilistic Latent Semantic Indexing substitute the singular values. The crucial difference between Probabilistic Latent Semantic Indexing and Latent Semantic Indexing, however, is the objective function utilized to determine the optimal decomposition/approximation.

In Latent Semantic Indexing, this is the $L_2$-norm or Frobenius norm, which corresponds to an implicit additive Gaussian noise assumption on (possibly transformed) counts. In contrast, Probabilistic Latent Semantic Indexing relies on the likelihood function of multinomial sampling and aims at an explicit maximization of the predictive power of the model. As is well known, this corresponds to a minimization of the cross entropy or Kullback-Leibler divergence between the empirical distribution and the model, which is very different from any type of squared deviation. On the modeling side this offers important advantages, for example, the mixture approximation P of the co-occurrence table is a well-defined probability distribution and factors have a clear probabilistic meaning. In contrast, Latent Semantic Indexing does not define a properly normalized probability distribution and may even contain negative entries. In addition, there is no obvious interpretation of the directions in the Latent Semantic Indexing latent space, while the directions in the Probabilistic Latent Semantic Indexing space are interpretable as multinomial word distributions.

Let us briefly discuss some elucidating examples at this point which will also reveal a further advantage of Probabilistic Latent Semantic Indexing over Latent Semantic Indexing in the context of polsemous words. We have generated a dataset (CLUSTER) with abstracts of 1568 documents on clustering and trained an aspect model with 128 latent classes. FIG. 7 is a table showing eight selected factors 50, 51, 52, 53, 54, 55, 56, 57 from a 128 factor decomposition along with their respective most probable words 60 in the class-conditional distribution P(w|z), from top to bottom in descending order. These pairs have been selected as the two factors 50 & 51, 52 & 53, 54 & 55, 56 & 57 that have the highest probability to generate the words "segment", "matrix", "line", and "power", respectively.

The sketchy characterization of the factors by their ten most probable words 60 already reveals interesting topics. In particular, notice that the term used to select a particular pair has a different meaning in either topic factor: (i) 'Segment' 50, 51 refers to an image region in the first and to a phonetic segment in the second factor; (ii) 'Matrix' 52, 53 denotes a rectangular table of numbers and to a material in which something is embedded or enclosed; (iii) 'Line' 54, 55 can refer to a line in an image, but also to a line in a spectrum; and (iv) 'Power' 56, 57 is used in the context of radiating objects in astronomy, but also in electrical engineering. FIG. 8 is a graphical representation of abstracts of two exemplary documents from the cluster collection along with latent class posterior probabilities. The posterior probabilities for the classes given the different occurrences of 'segment' 50, 51 indicate how likely it is for each of the factors in the first pair of FIG. 7 to have generated this observation. We have also displayed the estimates of the conditional word probabilities P{w='segment'|o$_{1,2}$}. One can see that the correct meaning of the word 'segment' 50, 51 is identified in both cases. This implies that although 'segment' 50, 51 occurs frequently in both documents, the overlap in the factored representation is low, since 'segment' 50, 51 is identified as a polysemous word (relative to the chosen resolution level) which—dependent on the context—is explained by different factors.

Next, the aspect model is compared with statistical clustering models. In clustering models for documents, one typically associates a latent class variable with each document in the collection. Most closely related to our invention is the distributional clustering model, which can be thought of as an unsupervised version of a naive Bayes' classifier. It can be shown that the conditional word probability of a probabilistic clustering model is given by $$P(w|o) = \sum_{a \in A} P\{c(o) = a\} P(w|a), \quad (7)$$

where $P\{c(o)=a\}$ is the posterior probability of document o having latent class a. It is a simple implication of Bayes' rule that these posterior probabilities will concentrate their probability mass on a certain value a with an increasing number of observations (i.e., with the length of the document). This means that although equations (1) and (7) appear algebraically similar, they are conceptually very different and yield in fact very different results. The aspect model assumes that document-specific distributions are a convex combination of aspects, while the clustering model assumes there is just one cluster-specific distribution, which is inherited by all documents in the cluster. In the distributional clustering model it is only the posterior uncertainty of the cluster assignments that induces some averaging over the class-conditional word distributions P(w|a).

Thus in clustering models the class-conditionals P(w|a) have to capture the complete vocabulary of a subset (cluster) of documents, while factors can focus on certain aspects of the vocabulary of a subset of documents. For example, a factor can be very well used to explain some fraction of the words occurring in a document, although it might not explain other words at all (e.g., even assign zero probability), because these other words can be taken care of by other factors. The difference between aspect and clustering models has to be emphasized. While the latent class structure of an aspect model partitions the observations, clustering models provide a group structure on object spaces. As a consequence, identical observations may have different latent classes in aspect models, whereas latent variables are shared by sets of observations in clustering models.

Probabilistic Latent Semantic Analysis

The aspect model for multivariate co-occurrence data is built on the assumption that all co-occurrences in the sample $S=(x_i^n) 1 \leq n \leq N$ are independent and identically distributed and that random variables $X_i^n$ and $X_j^n$, $i \neq j$ are conditionally independent given the respective latent class. The randomized data generation process can be described as follows:

(i) Choose an aspect a with probability $P(A=a)$ (or, in short notation, $P(a)$), and (ii) Select $x \in \{O, U, W\}$, for all $i \in I$ with probability $P(x_i|a)$.

The corresponding complete data probability, i.e., the joint probability of the data and a hypothetical instantiation for the latent variables, is given by $$P(S, \vec{a}) = \prod_{n=1}^{N} P(x_i^n, a^n) = \prod_{n=1}^{N} P(a^n) \prod_{i \in I} P(x_i | a^n) \quad (8)$$

By summing over all possible realizations of the latent variables and grouping identical co-occurrences together, one obtains the usual mixture probability distribution on the observables, $$P(S) = \prod_{x_I} P(x_I)^{n(x_I)} \text{ with} \quad (9)$$

$$P(x_I) = \sum_{a \in A} P(a) \prod_{i \in I} P(x_i \mid a). \quad (10)$$

Two fundamental problems arise in the context of statistical modeling, prediction or inference on one hand and model estimation or model learning on the other hand. In prediction, we have to compute probabilities $P(X_J|x_I, \theta)$ for given model parameters $\theta=(P(a), P(x_i|a))$ where we summarize all continuous parameters in a vector $\theta$. Remember that all spaces are discrete, thus e.g., $P(a)$ corresponds to a vector of dimension K. The problem of efficient prediction is addressed below. Estimation or learning on the other hand refers to determining the model parameters $\theta$ given a set of observations or training data S. It should, however, be emphasized that model estimation and prediction are computationally well-separated problems. Model learning can be performed offline, while online requirements often lead to high efficiency demands on prediction algorithms.

In the context of statistical models, learning can be identified with the problem of parameter estimation. Since the latent structure by definition consists of unobserved variables, the learning problem is essentially an unsupervised one. The present invention utilizes a novel Tempered Expectation Maximization (tempered EM, TEM) estimation procedure. Tempered Expectation Maximization is an effective learning procedure aspect models. In addition, it allows us to gradually control and reduce the effective degrees of freedoms used in the estimation process (as opposed to the maximal degree of freedoms allowed by the model itself). Tempered Expectation Maximization is a generalization of the standard Expectation Maximization (EM) algorithm used to compute maximum likelihood estimators for a probabilistic model. For better understanding, this standard algorithm is now described first. Maximum likelihood is implemented by maximizing the log-likelihood $\log P(S;\theta)$ with respect to the model parameters, which have been concatenated in a vector $\theta$ for notational convenience. The difficulties in maximizing a logarithm of a sum in the log-likelihood of the aspect model is overcome by Expectation Maximization. The Expectation Maximization algorithm and its extensions can be developed generically for the complete class of models covered by this invention and are easily adapted to the specific instances.

Expectation Maximization results in an alternating procedure with two re-estimation steps. The first is an Expectation (E)-step for estimating the posterior probabilities of latent variables for a given parameter estimate $\theta'$. The second is a Maximization (M)-step, which involves maximization of the expected complete data log-likelihood with respect to $\theta$, where the average is performed based on the posterior probabilities computed in the E-step. The Expectation Maximization algorithm is known to increase the observed likelihood with each completed iteration, and converges to a (local) maximum under mild assumptions. The E-step equations for the class posterior probabilities in the aspect model can be derived from Bayes' rule and are given by $$P(a \mid x_I; \theta) = \frac{P(a) \prod_{i \in I} P(x_i \mid a)}{\sum_{a'} P(a') \prod_{i \in I} P(x_i \mid a')}. \quad (11)$$

It is straightforward to derive the M-step re-estimation formulae by differentiating the expected complete data log-likelihood with respect to $\theta$. The latter is given by $$Q(\theta, \theta') = \sum_{x_I} n(x_I) \sum_{a} P(a \mid x_I; \theta') \log P(x_I, a \mid \theta), \quad (12)$$

where $n(x_I)$ again denotes the sufficient statistics (counts). The probabilities $P(a)$ are easily estimated by $P(a)=\Sigma_{x_I}P(a|x_I; \theta')n(x_I)/N$. After introducing appropriate Lagrange multipliers to ensure the correct normalization one obtains for the M-step formulae $$P(x_i \mid a) \sim \sum_{x_I} n(x_I) P(a \mid x_I; \theta'). \quad (13)$$

Tempered Expectation Maximization is a novel generalization of Expectation Maximization-based model fitting that incorporates ideas from deterministic annealing based combinatorial optimization. Tempered Expectation Maximization pursues two main goals; (i) avoiding over-fitting by controlling the effective model complexity, and (ii), reducing the sensitivity of Expectation Maximization to local maxima.

Consider, therefore, the general case of maximum likelihood estimation by the Expectation Maximization algorithm. The E-step by definition computes a posterior average of the complete data log-likelihood, which is maximized in the M-step. The tempered E-step at temperature T performs this average with respect to a distribution which is obtained by generalizing Bayes' formula such that the likelihood contribution is taken to the power of 1/T, i.e., in mnemonic notation: tempered~posterior~prior×likelihood$^{1/T}$. For T>1 this amounts to increasing the influence of the prior which in turn results in a larger entropy of the tempered posteriors. For mathematical precision, consider the following objective function $$F_T = (\theta, Q(\vec{a})) = \sum_{\vec{a}} Q(\vec{a}) \left[ \log P(S \mid \vec{a}; \theta) - T \log \frac{Q(\vec{a})}{P(\vec{a} \mid \theta)} \right] \quad (14)$$

where $Q(\vec{a})$ are variational parameters. Minimizing $F_T$ with respect to $Q(\vec{a})$ then yields $$Q(\vec{a}) \propto P(S \mid \vec{a}; \theta)^{1/T} P(\vec{a} \mid \theta). \quad (15)$$

For T=1 the usual posterior $Q(\vec{a})=P(\vec{a}|S;\theta)$ is obtained, which is equivalent to computing the standard E-step. In addition, for T=1 the derivative of the averaged complete data log-likelihood with respect to θ equals the derivative of $F_1$ in equation (14). Thus $F_1$ provides a Lyapunov function for the Expectation Maximization-algorithm, which is minimized with respect to $Q(\vec{a})$ in the E-step and with respect to θ in the M-step. In the aspect model, the tempered E-step generalizing equation (11) is given by $$P(a|x_j;\theta) \propto P(a)[P(x_j|a)]_{1/T}. \tag{16}$$

For fixed T>1 the tempered E-step performs a regularization based on entropy. This is the reason why tempered Expectation Maximization not only reduces the sensitivity to local minima but also controls the effective model complexity.

The Tempered Expectation Maximization algorithm is implemented in the following way:
 (i) Set T=1 and perform Expectation Maximization with early stopping.
 (ii) Increase T←nT (n>1) and perform one Tempered Expectation Maximization iteration.
 (iii) While performance on hold-out data improves: continue Tempered Expectation Maximization iterations,
 (iv) Return when increasing T does not yield further improvements
 (v) Return to step ii.

While aspect models already provide substantial modeling flexibility, the number of aspects chosen introduces a notion of granularity and scale. It basically determines how many topics or user tastes can be modeled at the same time. However, these entities are naturally described on different resolutions. The present invention employs two different methods. In the sequel, a simple solution is described which trains independent models on multiple scales and then combines them additively. More specifically, denoted by $P(x_J; M_I)$ the prediction of an observation with signature I based on the I-th model $M_I$. Then the combined estimate $$P(x_I) = \sum_l \lambda_l P(x_I; M_l) \tag{17}$$

is used to compute a probability estimate over different scales. The combination is convex, i.e., we require $\lambda_I \geq 0$ and $\Sigma_I \lambda_I = 1$. The model combination parameters $\lambda_I$ are determined by running the Expectation Maximization algorithm on hold-out data, a method referred to as deleted interpolation. More precisely, for each observation in a hold-out data set, we compute in the E-step the probability that the observation $x_I$ is best "explained" by $M_I$, $$P(M_l | x_I) = \frac{\lambda_l P(x_I; M_l)}{\sum_{l'} \lambda_{l'} P(x_I; M_{l'})}. \tag{18}$$

In the M-step one simply sums up those posterior probabilities $$\lambda_l \propto \sum_{x_I} P(M_l | x_I). \tag{19}$$

Re-iterating results in an estimate for the combination weights.

For large data sets, the Expectation Maximization algorithm may not be very efficient, since it requires cycling through all observations before actually performing a parameter update step. For highly redundant data sets, an additional intermediate update step based only on some fraction of the data can greatly accelerate the learning procedure. The extreme case would be to perform a parameter update step after each observation, which is usually called on-line learning. In an intermediate case, one would partition the data into blocks of observations and perform an incremental update step with a learning rate n after the E-step for a single block is completed $$\theta^{new} = (1-\eta)\theta^{old} + \eta\theta^{block}, \tag{20}$$

where $\theta^{block}$ is the M-step estimate computed for a particular block of observations. n<1 is decreased according to a learning rate schedule, asymptotically as $\eta a+1/(t+c)$, where t is the step number and c is a constant.

For prediction, we are interested in calculating probabilities $P(x_J|x_J)$. Assuming we are interested in computing the probability of an object given a query and a user, $P(o|w_1, \ldots, w_n; u)$. The first difficulty arises from the fact that we basically train models for co-occurrences with single w, so we assume conditional independence of keywords given object and user, $$P(w_1, \ldots, w_n | o, u) = \prod_i P(w_i | o, u) \tag{21}$$

to simplify things. This ensures that different keywords can be generated from different hidden states. More formally, using Bayes' rule we obtain $$P(o | w_1, \ldots, w_n; u) \sim P(o | u) P(w_i, \ldots, w_n | o, u) \tag{22}$$

$$= P(o | u) \prod_i P(w_i | o, u) \tag{23}$$

by equation (14) where $$P(w_i | o, u) = \sum_a P(w_i | a) P(a | o, u) \tag{24}$$

$$= \sum_a \frac{P(w_i | a) P(a | u)}{\sum_{a'} P(a | u) P(o | a')} P(o | a), \tag{25}$$

$$P(o | u) = \sum_a P(o | a) P(a | u), \tag{26}$$

$$P(a | u) = \frac{P(u | a) P(a)}{\sum_{a'} P(u | a') P(a')}. \tag{27}$$

The grouping of terms in equation (25) already indicates that for efficient computation we first evaluate the terms independent of o. Equation (27) can be computed offline with identical storage requirements. Other predictions can be carried out similarly by applying the rules of the calculus of probability theory starting from the trained model or combination of models.

In order to achieve an efficient implementation in a preferred embodiment, one should sparsen the representation of probability distributions by discarding probabilities that are below a certain threshold t. Basically, all parameter vectors are stored as sparse vectors, e.g. we set $P(x|a)=0$ iff $P(x|a)<t$. To achieve good approximation properties, t is made proportional on the number of entries in the vector $P(x|a)$. In addition to this sparse model representation, we also sparsen the final result vectors as well as most intermediate entities like $$P(w_i | a)P(a | u) \bigg/ \sum_{a'} P(a | u)P(o | a') \tag{28}$$

to achieve maximal computational efficiency.

The Cluster-Abstraction Model

Figure 2:
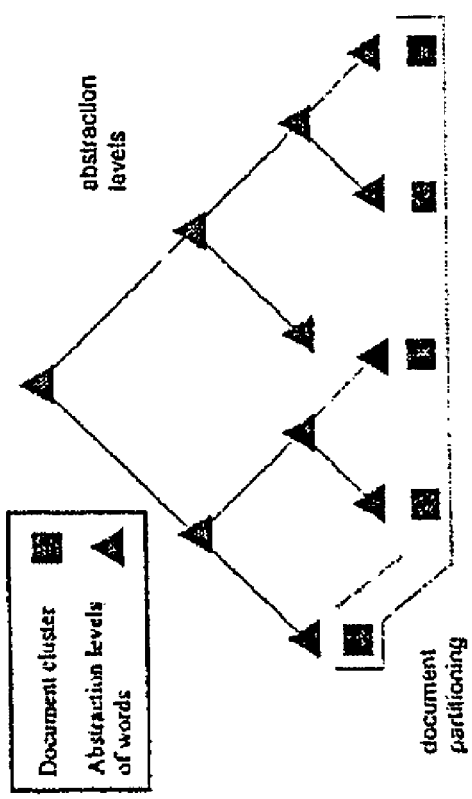
FIG. 2 is a schematic representation of the cluster-abstraction structure.

We next describe the cluster abstraction model. As previously noted, mixture models provide structural information about data-inherent grouping structure and are thus well suited to perform data mining functions. The cluster abstraction model combines a (horizontal) clustering of documents with a (vertical) aspect model that explains shared factors on different levels of resolutions. The clustering part is demonstrated by the simplified, non-hierarchical version of the Cluster Abstraction Model, which performs 'flat' probabilistic clustering, described earlier as the distributional clustering model, see derivation above. Most hierarchical document clustering techniques utilize agglomerative algorithms, which generate a cluster hierarchy or dendogram as a by-product of successive cluster merging. In the Cluster Abstraction Model we will use an explicit abstraction model instead to represent hierarchical relations between document groups. This is achieved by extending the 'horizontal' mixture model of the distributional clustering with a 'vertical' component that captures the specificity of a particular word $w_t$ in the context of a document o. It is assumed that each word occurrence $(w_t,o)=w_{ot}$ of a word $w_t$ in document o has an associated abstraction node a, the latter being identified with inner or terminal nodes of the cluster hierarchy. FIG. 2 is a schematic representation of the cluster abstraction structure. To formalize the sketched ideas, additional latent variable vectors $a_o$ with components $a_{ot}$ are introduced which assign the words in o to exactly one of the nodes in the hierarchy. Based on the topology of the nodes in the hierarchy the following constraints between the cluster variables $c_o$ and the abstraction variables $a_{ot}$ are imposed:

$$a_{ot} \in \{a | a \text{ is above } c_o \text{ in the hierarchy}\} \tag{28A}$$

The notation $a \uparrow c$ will be used as a shortcut to refer to nodes a above the terminal node c in the hierarchy. Equation (28A) states that the admissible values of the latent abstraction variables $a_{ot}$ for a particular document with latent class $c_o$ are restricted to those nodes in the hierarchy that are predecessors of $c_o$. This breaks the permutation-symmetry of the abstraction nodes as well as of the document clusters. An abstraction node a at a particular place in the hierarchy can only be utilized to "explain" words of documents associated with terminal nodes in the subtree of a. FIG. 3 is a schematic representation showing the assigning occurrences to abstraction levels in terms of latent class variables. If o is assigned to c the choices for abstraction nodes for word occurrences $w_{ot}$ are restricted to the 'active' (highlighted) vertical path 10. One may think of the Cluster Abstraction Model as a mixture model with a horizontal mixture of clusters and a vertical mixture of abstraction levels. Each horizontal component is a mixture of vertical components on the path to the root, vertical components being shared by different horizontal components according to the tree topology. Generalizing the non-hierarchical model, a probability distribution $P(w|a)$ over words is attached to each node (inner or terminal) of the hierarchy.

After application of the chain rule, the complete data model (i.e., the joint probability of all observed and latent variables) can be specified in three steps $P(c_o=c;\theta)=P(c)$, $P(a_{ot}=a|c_o=c;\theta)=P(a|c,o)$, and $$P(w_o | a_o; \theta) = \prod_{t=1}^{n(o)} P(w_{ot} | a_{ot}). \tag{29}$$

Note that additional document-specific vertical mixing proportions $P(a|c, o)$ over abstraction nodes above cluster c have been introduced, with the understanding that $P(a|c, o)=0$ whenever it is not the case that $a \uparrow c$. If one makes the simplifying assumption that the same mixing proportions are shared by all documents assigned to a particular cluster (i.e., $P(a|c, o)=P(a|c)$), the solution degenerates to the distributional clustering model since one may always choose $P(a|c)=\delta_{ac}$. However, we propose to use this more parsimonious model and fit $P(a|c)$ from hold-out data (a fraction of words held out from each document), which is in the spirit of model interpolation techniques.

As for the distributional clustering model before, we will derive an Expectation Maximization algorithm for model fitting. The E-step requires to compute (joint) posterior probabilities of the form $P(c_d=c, a_{ot}=a|w_o; \theta)$. After applying the chain rule one obtains:

$$P(c_o = c | w_o; \theta) \propto P(c) \prod_w \left[\sum_a P(w | a)P(a | c)\right]^{n(o,w)}, \tag{30}$$

$$P(a_{ot} = a | w_o, c_o = c; \theta) = \frac{P(w_{ot} | a)P(a | c)}{\sum_{a'} P(w_{ot} | a')P(a' | c)}. \tag{31}$$

The M-step re-estimation equations for the conditional word distributions are given by $$P(w | a) = \frac{\sum_o \sum_{t:w_{ot}=w} P(a_{ot} = a | w_o; \theta)}{\sum_o \sum_t P(a_{ot} = a | w_o; \theta)}, \tag{32}$$

where $P(a_{ot}=a|w_o; \theta)=\sum_c P(c_o=c|w_o; \theta) P(a_{ot}=a|w_o, c_o=c; \theta)$. Moreover, we have the update equation $$(P(c) = \frac{1}{I}\sum_d P(c_d = c | w_d; \theta))$$

for the class priors P(c) and the formula $$P(a|c) \propto \sum_o P(c_o = c | w_o; \theta) \times \sum_t P(a_{ot} = a | w_o, c_o = c; \theta) \quad (33)$$

which is evaluated on the held-out data. Finally, it may be worth taking a closer look at the predictive word probability distribution P(w|o) in the Cluster Abstraction Model, which is given by $$P(w|o) = \sum_c P(c_o = c | w_o; \theta) \sum_a P(a|c) P(w|a). \quad (34)$$

If we assume for simplicity that $P(c_o = c | w_o; \theta) = 1$ for some c (hard clustering case), then the word probability of o is modeled as a mixture of occurrences from different abstraction levels a. This reflects the reasonable assumption that each document contains a certain mixture of words ranging from general terms of ordinary language to highly specific technical terms and specialty words.

There are three important problems, which also need to be addressed in a successful application of the Cluster Abstraction Model: First and most importantly, one has to avoid the problem of over-fitting. Second, it is necessary to specify a method to determine a meaningful tree topology including the maximum number of terminal nodes. And third, one may also want to find ways to reduce the sensitivity of the Expectation Maximization procedure to local maxima. The present invention finds the answer to all three questions through the optimization algorithm introduced above as tempered Expectation Maximization.

Applying the temperature principle to the clustering variables, the posterior calculation in equation (30) is generalized by replacing n (o, w) in the exponent by n(o, w)/T. In annealed Expectation Maximization (as opposed to "heated" Expectation Maximization discussed above), T is utilized as a control parameter, which is initialized at a high value and successively lowered until the performance on the held-out data starts to decrease. Annealing offers a way to generate tree topologies, since annealing leads through a sequence of so-called phase transitions, where clusters split. In our experiments, T has been lowered until the perplexity (i.e., the log-averaged inverse word probability) on holdout data starts to increase, which automatically defines the number of terminal nodes in the hierarchy.

Extension to Preference Values.

When observing user behavior and preferences one may have richer observations than plain co-occurrences. Many use cases may also provide some additional preference value v with an observation. In this invention, we will treat the simplest case, where $v \in \{-1, +1\}$ corresponds to either a negative or a positive example of preference, modeling events like "person u likes/dislikes object o".

Let us now focus on extending the aspect model to capture additional binary preferences $v \in \{-1, +1\}$. The probabilistic latent semantic analysis models can be generalized to handle arbitrary preference values, which requires specifying an appropriate likelihood function based on assumptions on the preference scale. We distinguish two different cases: (i.) situations where the person performs the selection of an object, and then announces her or his preference in retrospect, (ii.) problems where the selection of o is not part of the behavior to be modeled, for instance because it is controlled or triggered by some other external process.

In the first case, there are three different ways to integrate the additional random variable v into the model. v can be conditionally independent of o and u given a, which is a very strong assumption. One implication is that aspects are typically employed to either model positive or negative preferences. In addition, v also depends on either u or o, which offers considerably more flexibility, but also requires estimating more parameters. It is straightforward to modify the Expectation Maximization equations appropriately. We show the equations for the model, where v is assumed to be directly dependent on o, and only indirectly dependent on u through a. The other variants require only minor changes.

For the E-step one obtains $$P(a|o, u, v) = \frac{P(a)P(u|z)P(o, v|a)}{\sum_{z'} P(a')P(u|a')P(o, v|a')} \quad (35)$$

while the M-step equations can be summarized into $$P(o, v|a) = \frac{\sum_u n(o, u, v) P(a|o, u, v)}{\sum_{o,u',v'} n(o, u', v') P(a|o, u', v')}, \quad (36)$$

where n(o, u, v) denotes the number of times a particular preference has been observed (typically $n(o, u, v) \in \{0, 1\}$). From P(o, v|a) one may also derive P(o|a) and P(v|o, a), if necessary. The M-step equation for P(u|a) does not change. Effectively the state space of O has been enlarged to $O' = O \times \{-1, +1\}$.

In the second case, the multinomial sampling model of selecting o or a (o, v) pair conditioned on a is no longer adequate. We thus invented a modification of the aspect model and replace multinomials P(o|a) with Bernoulli probabilities P(v|o, a), assuming that o is always conditioned on. This modification results in the E-step $$P(a|o, u, v) = \frac{P(a)P(u|a)P(v|o, a)}{\sum_{a'} P(a')P(u|a')P(v|o, a')}. \quad (37)$$

and a M-step re-estimation formula $$P(v|o, a) = \frac{\sum_u P(a|o, u, v)}{\sum_{v=\pm 1} \sum_{u'} P(a|o, u', v)}. \quad (38)$$

Comparing equation(37) with equation (35) one observes that P(v|o,a) now replaces P(v,o|a) since o is treated as a fixed (observation-dependent) conditioning variable. Note that by conditioning on both, o and u, one gets $P(v|o,u) = \Sigma_a P(v|o, a)P(a|u)$ which reveals the asymmetry introduced into the aspect model by replacing one of the class-conditional multinomials with a vector of Bernoulli probabilities.

Implementation

Figure 9:
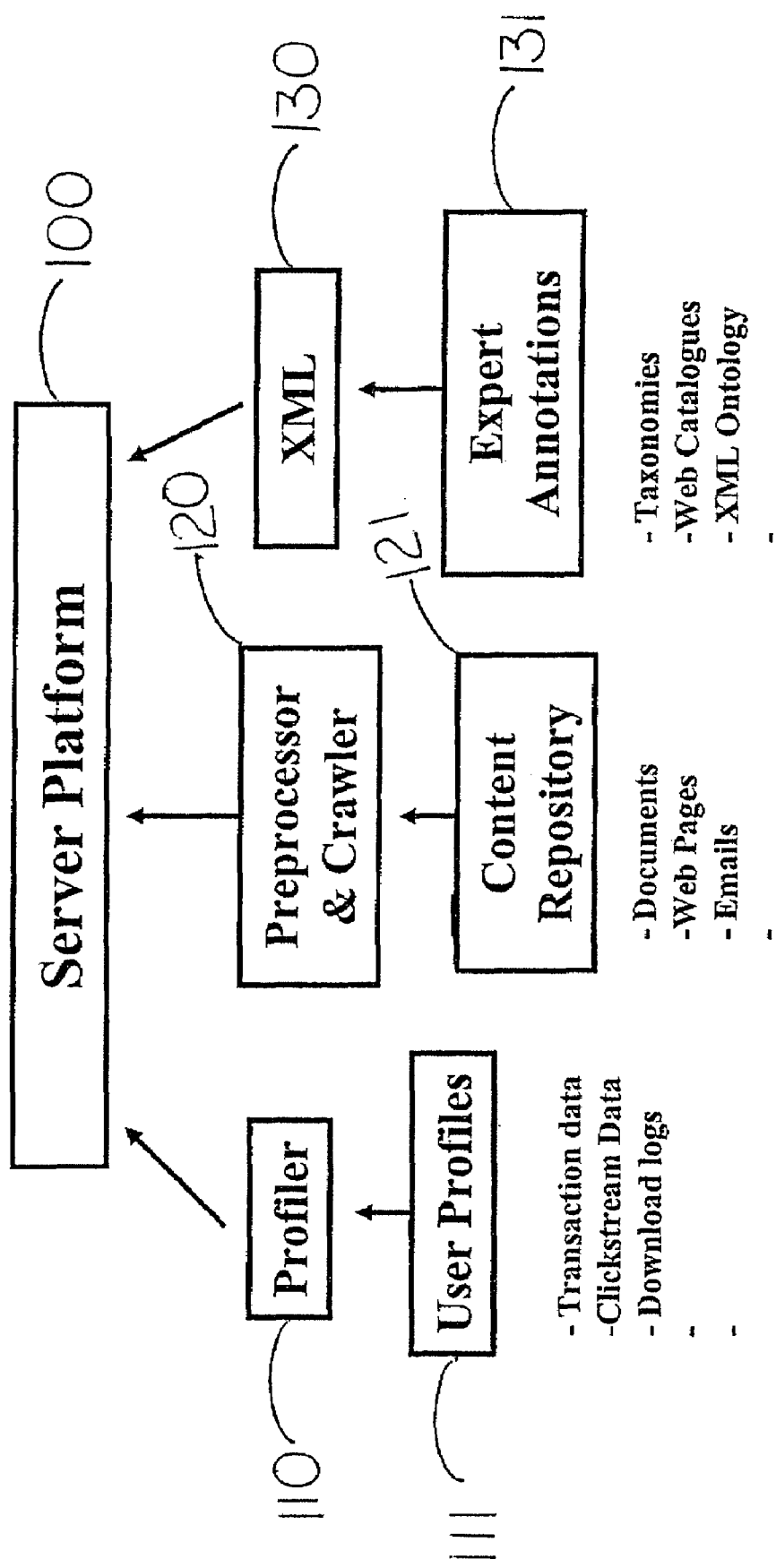
FIG. 9 is a schematic representation showing the information aggregation and integration of the present invention.

FIGS. 9 through 13 illustrate an implementation of latent class models for personalized information filtering and recommendations. FIG. 9 shows the primary input streams into server platform 100. User profiles 111 are processed through a profiler module 110 to provide the user related information, such as transaction data, click stream data, download, demographic information, etc. Document information, such as text documents, web pages, emails, etc. comes from a content repository 121 and is processed by a preprocessor and crawler module 120. Content repository 121 can be single proprietary database owned by the user. It can be any collection of data sources including any and all of the information available on the World Wide Web. The final primary input stream is expert annotations 131, including taxonomies, web catalogues, XML ontology, etc. and is processed by XML-parsing module 130. Here we assume that expert annotations of documents are stored as XML tags with the documents. Although this is common nowadays, other interfaces are of course possible.

Figure 10:
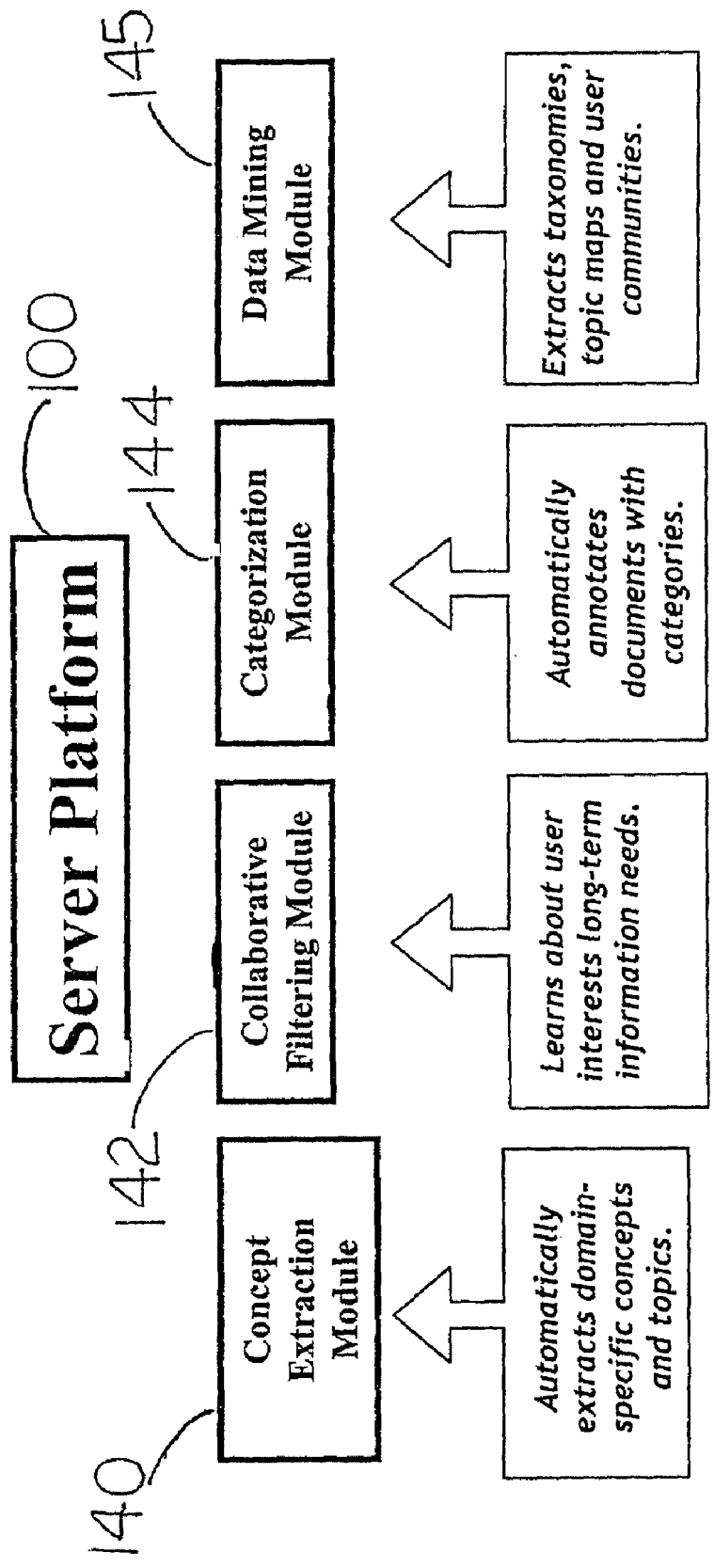
FIG. 10 is a schematic representation illustrating the various modules of one implementation of the present invention.

FIG. 10 illustrates the main data processing modules for latent class models for personalized information filtering and recommendations. The concept extraction module 140 automatically extracts domain-specific concepts and topics for the documents provided by the preprocessor and crawler module 120. Preferably, this extraction includes statistically analyzing the data to learn the semantic associations between words within specific items in the acquired data. Also, preferably, probabilities for each learned semantic association are computed. The collaborative filtering module 142 analyzes the user profiles 111 provided by profiler 110 to learn about user interests long-term information needs. The collaborative filtering module performs 142 two functions: 1) it analyzes the current user's historical profile; and 2) it analyzes other users' historical profiles. Preferably both profile analyses are used in combination with the learned semantic associations and computed probabilities to provide improved predictions or recommendations lists. The categorization module 144 automatically annotates documents with appropriate categories. The data mining module 145 extracts taxonomies, topic maps and user communities. Depending upon the needs of the user one or more of these modules 140, 142, 144, 145 are used to implement latent class modeling for personalized information filtering and recommendations. All four modules are not necessarily used for each implementation.

Figure 11:
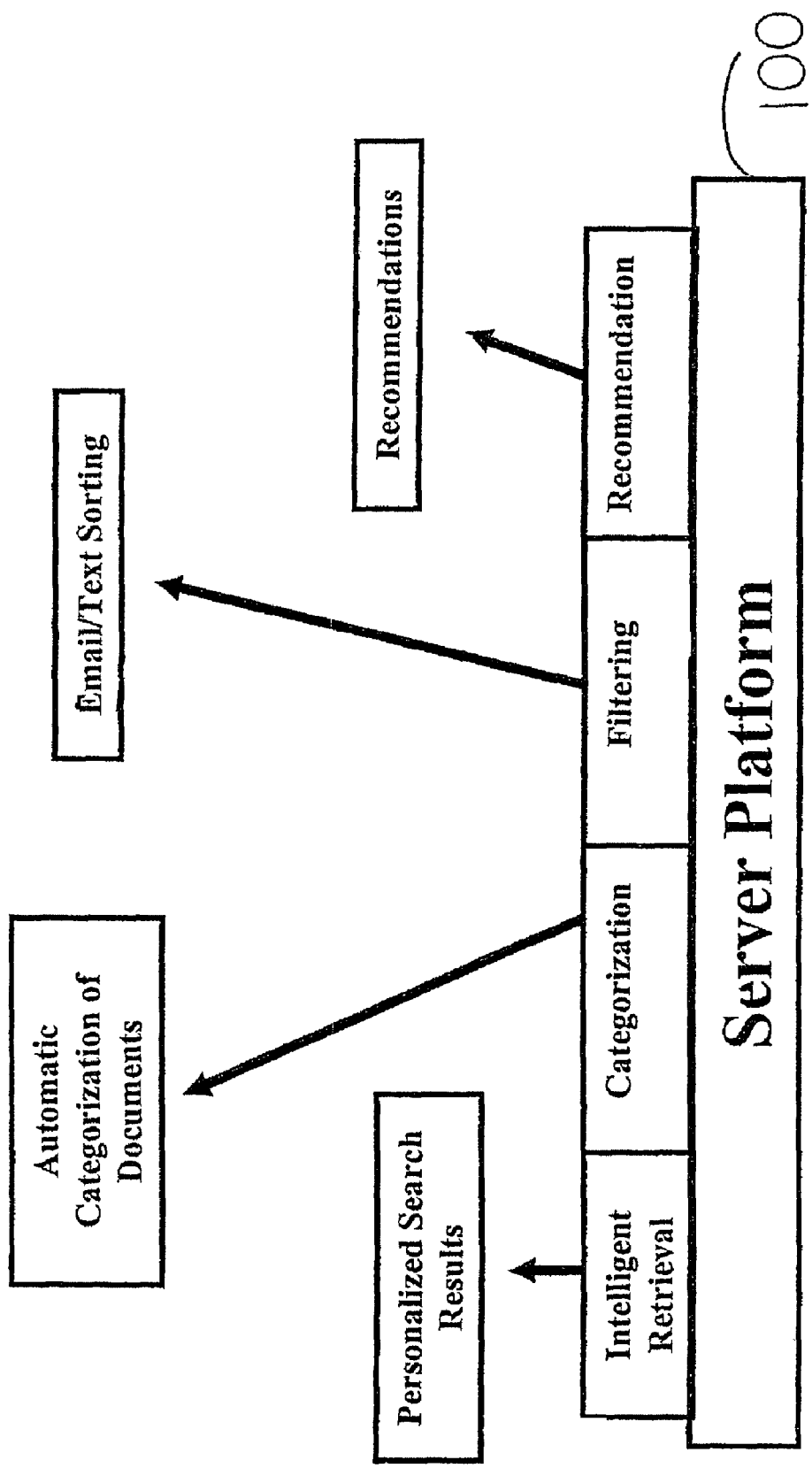
FIG. 11 is a second schematic representation illustrating the various modules of one implementation of the present invention.

FIG. 11 illustrates some of the preferred applications of the present invention. Functions included in the software provided by the server platform 100 are intelligent retrieval, categorization, filtering and recommendation. The intelligent retrieval of information incorporates user information from a user profile and from collaborative filtering into the search. From these functions, the present invention can provided personalized search results, automatic categorization of documents, email and text sorting and recommendations. The automatic categorization of documents categorizes the data into existing taxonomies and subject heading classification schemas. The email/text sorting can be used for intelligent information routing for customer relationship management (CRM) supply chain, distributed networking, storage, eMarketplaces, and web application server environments.

Figure 12:
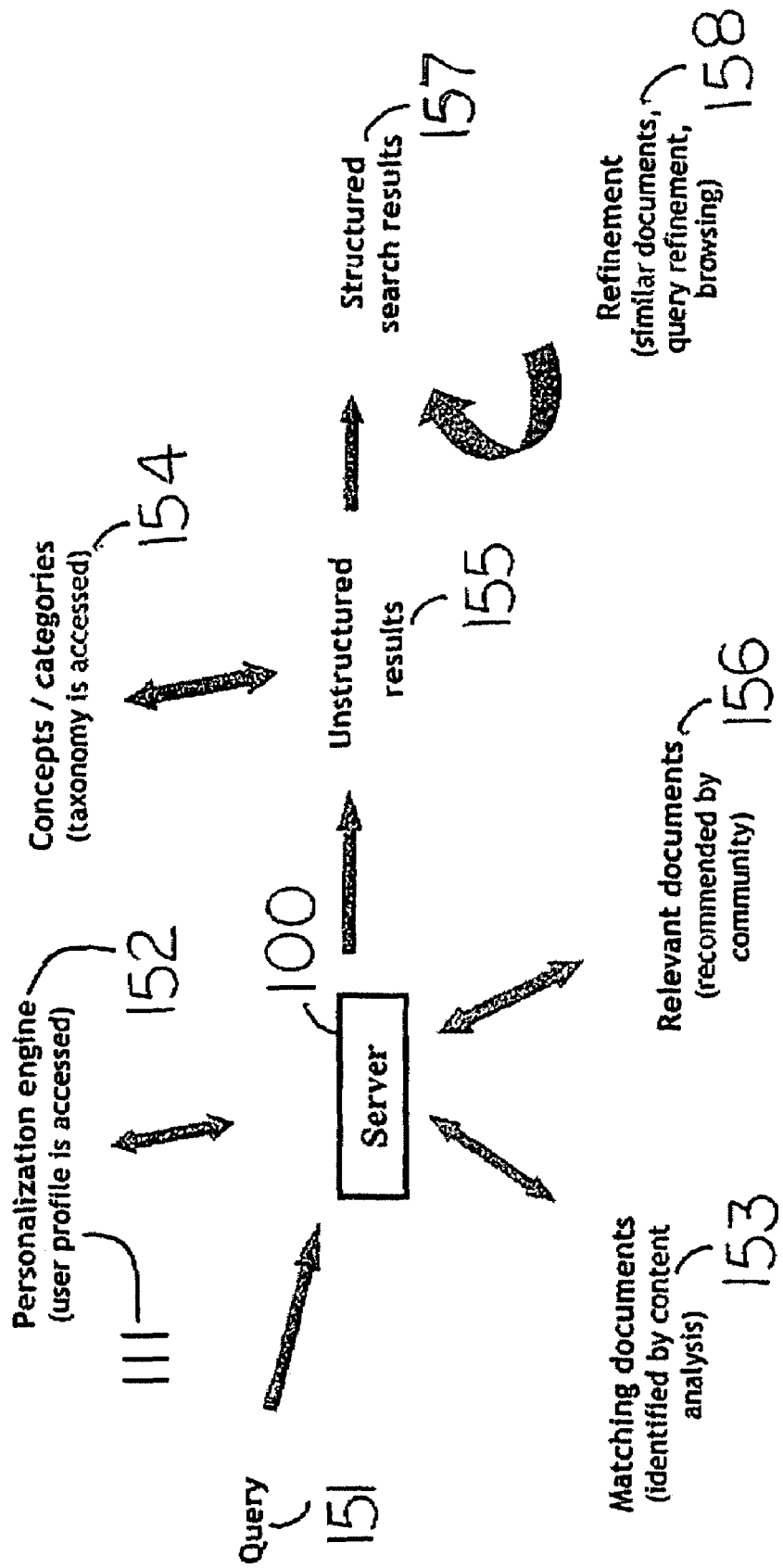
FIG. 12 is a schematic representation illustrating a retrieval engine for the present invention.

FIG. 12 illustrates one implementation of the present invention. A query 151 is input into server 100. The server 100 identifies matching documents 153 based on pure content analysis, it then connects the personalization engine 152 to access the user profile 111. Using the query 151 and the user profile 111, the server 100 uses the full probabilistic latent semantic analysis of user (community) data and content, 156 to produces an unstructured result list 155 with associated relevance scores. The taxonomy 154 is accessed to apply relevant concepts and categories to refine the unstructured result 155 into a structured search result 157. The structured search result can be further refined by including similar documents, refinement of the query by the user, etc.

Figure 13:
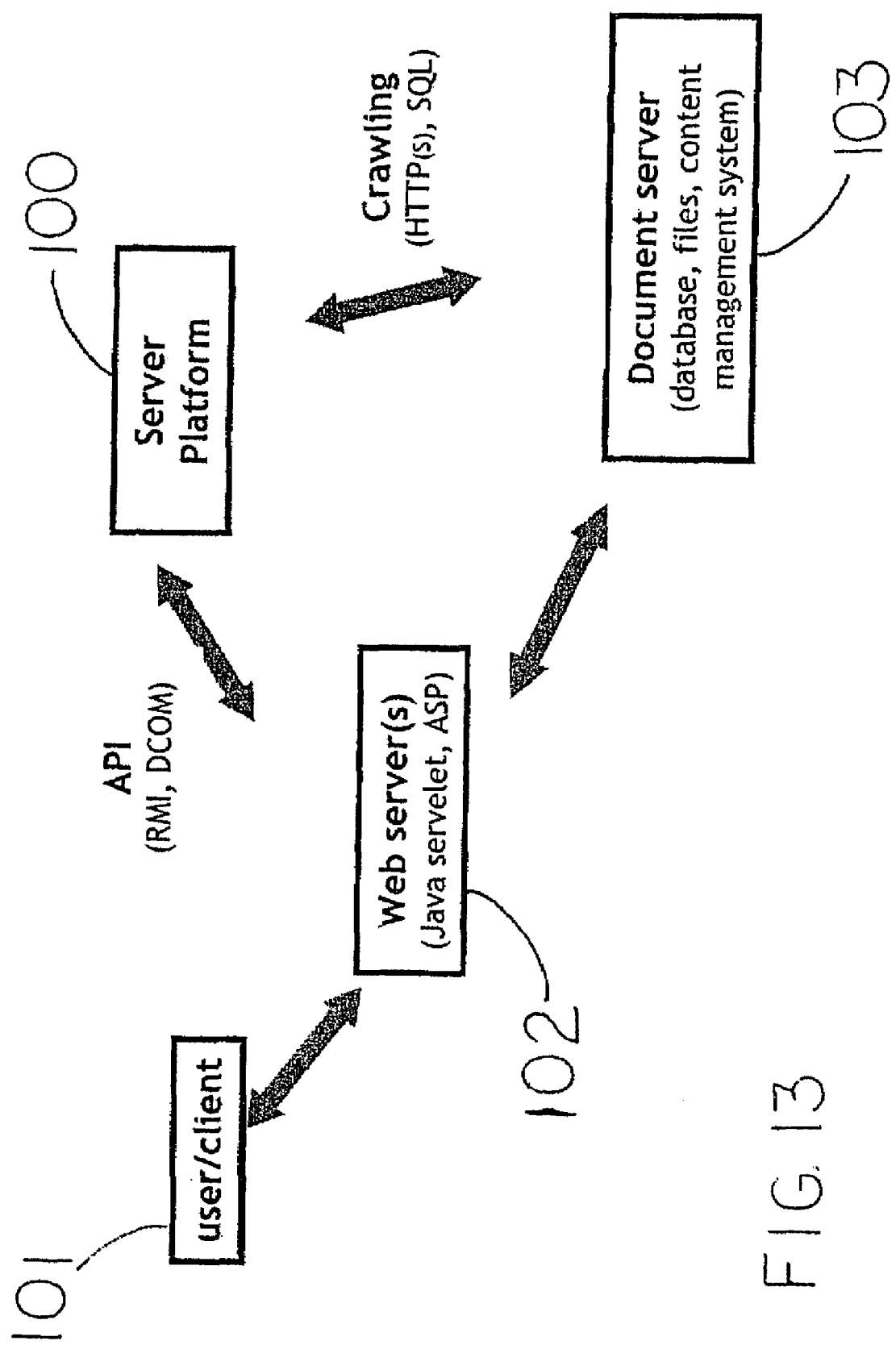
FIG. 13 is a schematic representation illustrating the overall implementation of the present invention.

FIG. 13 is an overall representation of an implementation of latent class modeling for personalized information filtering and recommendations. Server 100 initially acquires a set of data or documents by such means as web crawlers or spiders. Alternatively, the documents could be directly provided by the client in the form of a database or a proprietary database. This set of data is analyzed by server 100 using probabilistic latent semantic analysis to provide a set of statistical latent class models with appropriate model combination weights along with a probability of occurrence for each possible combination of items, content descriptors, users, object or user attributes. The set of models along with the relevant document information is stored on document server 103. A user or client 101 access server through a web server 102 and inputs a query to server 100. Server 100 then produces a recommendation list for user 101 using the set of models and a user profile.

Before processing the user's request, the server 100 analyzes the data collection and automatically extracts concepts, topics, and word contexts that are fully adapted to the specific data and the specific domain. The server 100 extracts concepts from the documents automatically, thus removing the need to manually tag documents. Most document collections are based on a very specific vocabulary, terminology or jargon. Contrary to standard information retrieval engines based on general dictionaries or thesauri, server 100 automatically creates indices and adapts and optimizes with respect to a specific document base. The server 100 architecture is divided into three main components: the learning module, the prediction module, and the data store. The learning module takes content (emails, documents, web-pages, data), adds it to the data store or document server 103 and makes this content accessible for searching, categorizing, filtering, and delivery. The prediction module is used to perform searches against indexed documents. A search is entered using a web search page. The prediction module reduces the search to a set of documents that most clearly match the criteria of the search, and formats this set into a series of document lists, segmented by category. Because the system knows the different meanings of words, it can accommodate ambiguities by returning multiple result lists along with characterizing keywords. For example, the system can distinguish between Apple, the computer company; apple, the fruit; and Apple, the Beatles record company, and group the search results into three distinct lists. Users can then refine or rephrase queries.

Figure 14:
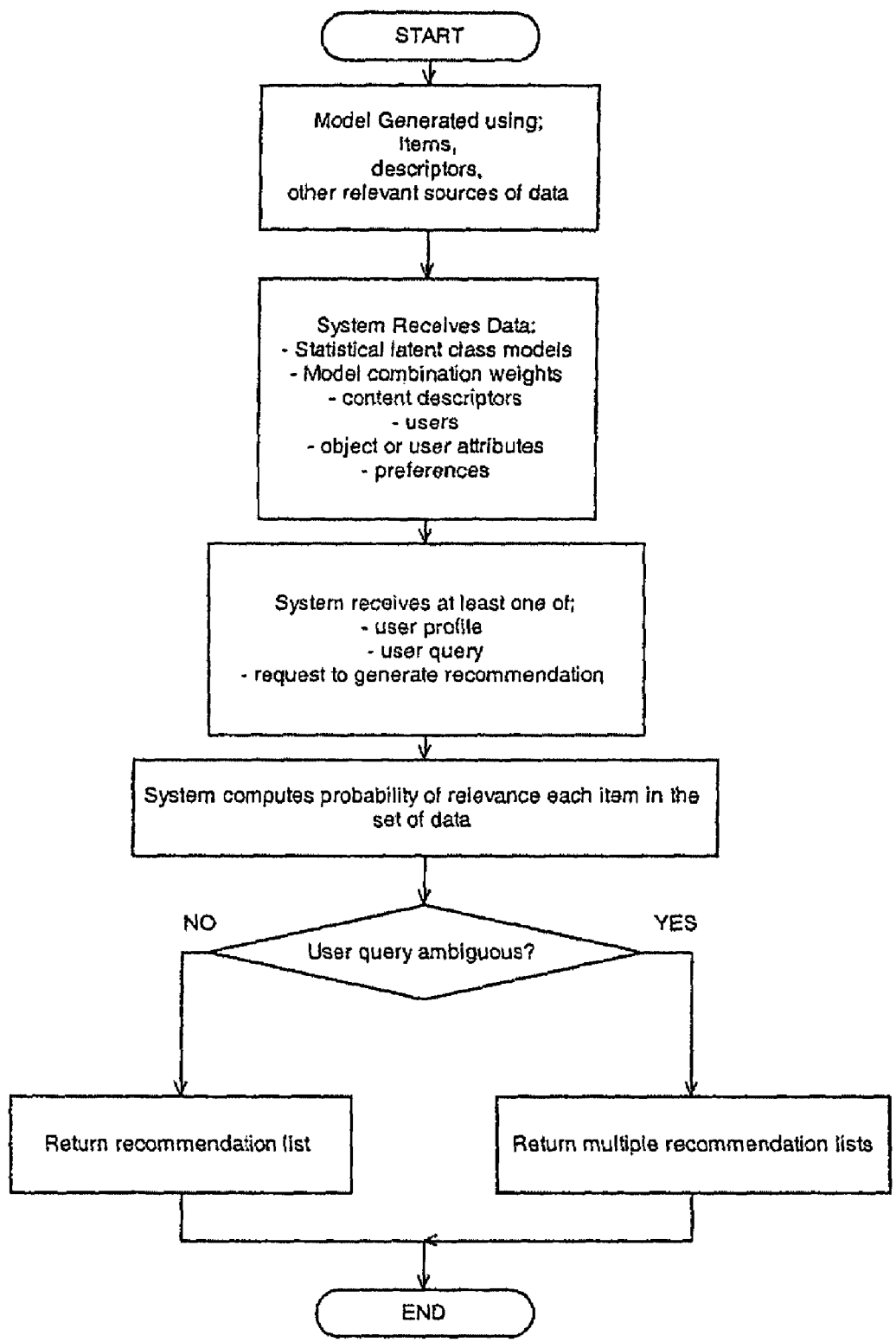
FIG. 14 is a flow chart illustrating the overall method for generating recommendation lists.

FIG. 14 is a flow chart illustrating the overall method for generating recommendation lists. A statistical latent class model is generated using data, items, and other relevant sources of data. The system receives data including the statistical latent class models, content descriptors, user data, object or user attributes, preferences, and other relevant data. The system then receives at least one of: (1) a user profile; (2) user query; and (3) a request to generate a recommendation. Next the probability of relevance of each item in the set of data is computed. If the user query received is ambiguous, then the system will return multiple recommendation lists. Otherwise, the system will return a single recommendation list.

Figure 15:
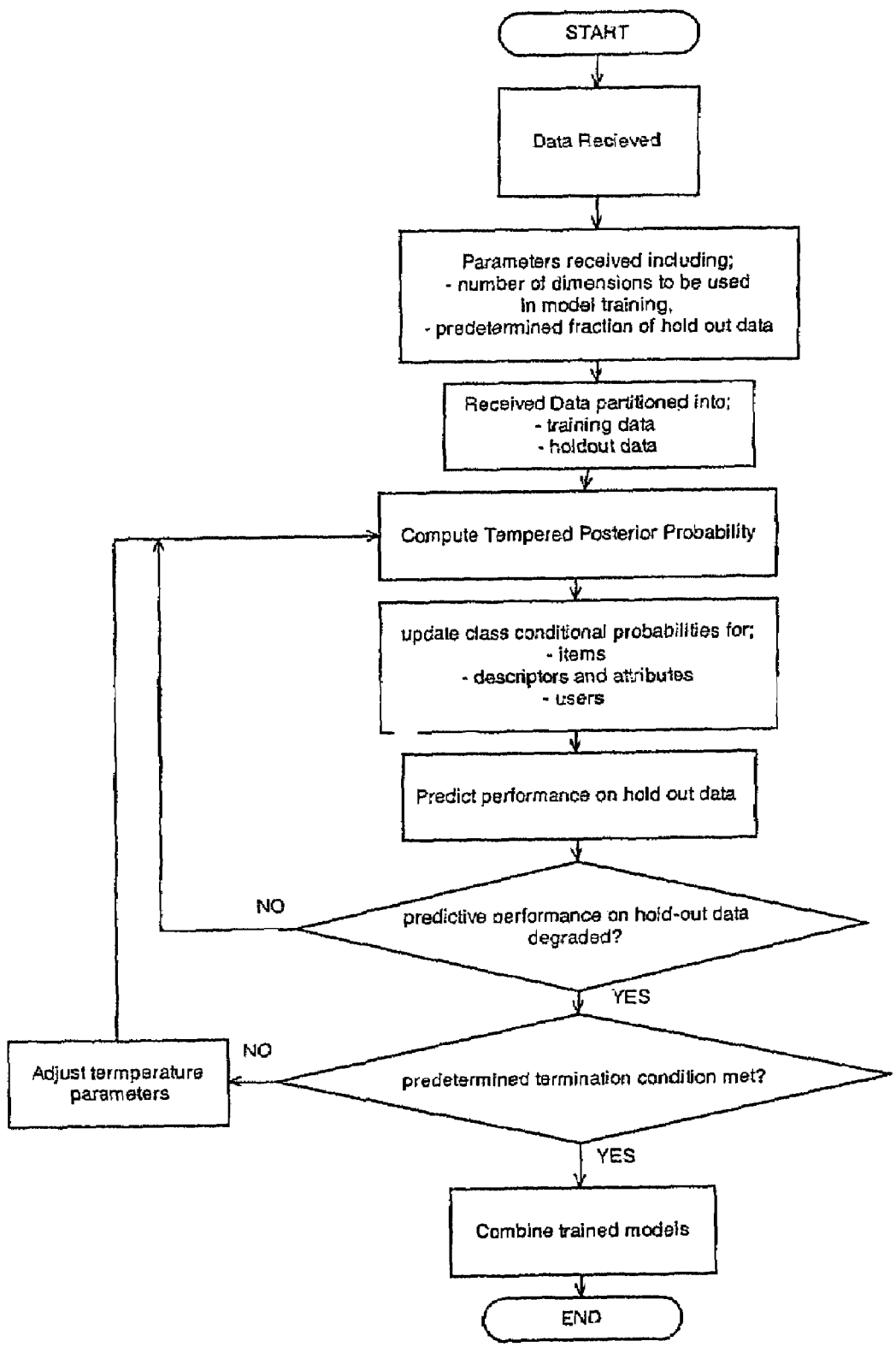
FIG. 15 is a flow chart illustrating the process of training a latent class model.

FIG. 15 is a flow chart illustrating the process of training a latent class model. Data in the form of a list of tuples of entities is received into the system. Parameters are then received into the system including; (1) a number of dimensions to be used in model training; (2) predetermined fraction of hold out data; and (3) a termination condition. The system then partitions the received data into training data and hold out data. Tempered posterior probabilities are then computed for each tupel and each possible state of a corresponding latent class variable. Next, using the posterior probabilities, the system updates the class conditional probabilities for items, descriptors and attributes, and users. The system continues to iterate the steps of computing tempered posterior probabilities and updating class conditional probabilities until the predictive performance on the hold out data degrades. Then the temperature parameter is adjusted and tempered posterior probabilities continue to be computed until the termination condition is met. Finally, the system combines the trained models.

The invention claimed is:

1. A method in a computer system for generating a recommendation list of desired items from a set of data including at least one of: items, content descriptors for the items, user profiles about transactions, prior searches, user ratings and user actions, to generate a recommendation list of desired items, comprising the steps of:
   statistically analyzing the set of data to learn semantic associations between words within specific items of the set of data, storing the learned semantic associations in computer hardware;
   computing probabilities of each learned semantic association;
   receiving into the computer system for generating a recommendation list: an actual user profile, a user query; and a request to generate at least one recommendation list, items in the recommendation list being ranked by their likelihood of being the desired items;
   computing a probability of relevance of each item in the set of data to the actual user profile and said user query, the step of computing a probability of relevance including combining the learned semantic associations and the actual user profile; and
   generating at least one recommendation list of desired items.

2. A method in a computer system containing a recommendation system for a set of data including items, content descriptors for the items, user profiles about transactions, prior searches, user ratings or user actions, to generate a recommendation list of desired items, comprising the following steps:
   receiving into the recommendation system a set of statistical latent class models along with appropriate model combination weights, each possible combination of items, content descriptors, users, object attributes or user attributes, and preferences being assigned a probability indicating the likelihood of that particular combination, storing the set of statistical latent class models in computer hardware;
   receiving into the recommendation system at least one of: an actual user profile; and a user query;
   receiving into the recommendation system a request to generate at least one recommendation list, items in the recommendation list being ranked by their likelihood of being desired items
   when said user query is not received into the recommendation system, generating a user query;
   computing a probability of relevance for each item in the set of data utilizing the received set of statistical latent class models and the set of data, the step of computing a probability of relevance includes accounting for a temporal structure of transactions, ratings and user actions; and computing the probabilities of relevance of items to a user for a particular point in time; and
   generating at least one recommendation list, each recommendation list having a variable length and consisting of a ranked list of desired items, the items being ranking based on the computed probability of relevance.

3. A method in a computer system containing a recommendation system for a set of data including items, content descriptors for the items, user profiles about transactions, prior searches, user ratings or user actions, to generate a recommendation list of desired items, comprising the following steps:
   receiving into the recommendation system a set of statistical latent class models along with appropriate model combination weights, each possible combination of items, content descriptors, users, object attributes or user attributes, and preferences being assigned a probability indicating the likelihood of that particular combination, storing the set of statistical latent class models in computer hardware;
   receiving into the recommendation system at least one of: an actual user profile; and a user query;
   receiving into the recommendation system a request to generate at least one recommendation list, items in the recommendation list being ranked by their likelihood of being desired items;
   when said user query is not received into the recommendation system, generating a user query;
   computing a probability of relevance for each item in the set of data utilizing the received set of statistical latent class models and the set of data, the step of computing a probability of relevancy includes computing expected utility to the user using the probability of relevance for each of the items; and
   generating at least one recommendation list, each recommendation list having a variable length and consisting of a ranked list of desired items, the items being ranking based on the computed probability of relevance.

4. The method according to claim 3, wherein the at least one returned recommendation list further includes a list of object attributes, the attributes being determined by the following steps:
   for each recommendation list, computing for each object attribute, a probability of the object attribute occurring in one of the items in the recommendation list based on the received set of statistical latent class models, weighted with their respective probabilities of relevance, and weighted with prior object attribute weights;
   sorting the object attributes in each recommendation list; and
   returning at least a higher probability portion of a sorted list of object attributes with the recommendation list.

5. The method according to claim 3, further comprising:
   recognizing that the user query is ambiguous based on the received set of statistical latent class models; and
   when the user query is ambiguous, distributing the items over multiple recommendation lists.

6. The method according to claim 3, further comprising: computing predictions of unobserved variables.

7. A method in a computer system containing a recommendation system for a set of data including items, content descriptors for the items, user profiles about transactions, prior searches, user ratings or user actions, to generate a recommendation list of desired items, comprising the following steps:
generating a set of statistical latent class models by probabilistic latent semantic indexing and storing the set of statistical latent class models in computer hardware;
receiving into the recommendation system the set of statistical latent class models along with appropriate model combination weights, each possible combination of items, content descriptors, users, object attributes and user attributes, and preferences being assigned a probability indicating the likelihood of that particular combination;
receiving into the recommendation system at least one of: an actual user profile; and a user query;
receiving into the recommendation system a request to generate at least one recommendation list, items in the recommendation list being ranked by their likelihood of being desired items;
when said user query is not received into the recommendation system, generating a user query;
computing a probability of relevance for each item in the set of data utilizing the received set of statistical latent class models and the set of data; and
generating at least one recommendation list, each recommendation list having a variable length and consisting of a ranked list of desired items, the items being ranking based on the computed probability of relevance.

8. The method according to claim 7, wherein the step of receiving into the recommendation system at least one of: an actual user profile; and a user query comprises receiving an actual user profile, the received actual user profile including a prior history.

9. The method according to claim 7, wherein the at least one returned recommendation list further includes a list of object attributes, the object attributes being determined by the following steps:
for each recommendation list, computing for each object attribute, a probability of the object attribute occupying in one of the items in the recommendation list based on the received set of statistical latent class models, weighted with their respective probabilities of relevance, and weighted with prior object attribute weights;
sorting the object attributes in each recommendation list; and
returning at least a higher probability portion of a sorted list of object attributes with the recommendation list.

10. The method according to claim 9, wherein the object attributes include keywords.

11. The method according to claim 7, further comprising:
recognizing that the user query is ambiguous based on the received set of statistical latent class models; and
when the user query is ambiguous, distributing the items over multiple recommendation lists.

12. The method according to claim 7, further comprising: computing predictions of unobserved variables.

13. The method according to claim 12, wherein the set of data includes user ratings and the unobserved variables include at least one of user ratings on items and query terms.

14. The method according to claim 7, wherein prior to the step of receiving a set of statistical latent class models, learning user model parameters.

15. The method according to claim 7, wherein the set of received models form a hierarchy that is used in successive refinement of the user query.

16. A method in a computer system containing a recommendation system for a set of data including items, content descriptors for the items, user profiles about transactions, prior searches, user ratings or user actions, to generate a recommendation list of desired items, comprising the following steps:
receiving into the recommendation system a set of statistical latent class models along with appropriate model combination weights, each possible combination of items, content descriptors, users, object attributes and user attributes, and preferences being assigned a probability indicating the likelihood of that particular combination, storing the set of statistical latent class models in computer hardware;
receiving into the recommendation system at least one of: an actual user profile; and a user query;
receiving into the recommendation system a request to generate at least one recommendation list, items in the recommendation list being ranked by their likelihood of being desired items;
when said user query is not received into the recommendation system, generating a user query;
prior to the step of computing a probability of relevance, setting preference probabilities below a predetermined threshold to zero,
computing a probability of relevance for each item in the set of data utilizing the received set of statistical latent class models and the set of data; and
generating at least one recommendation list, each recommendation list having a variable length and consisting of a ranked list of desired items, the items being ranking based on the computed probability of relevance.

17. The method according to claim 16, wherein the at least one returned recommendation list further includes a list of object attributes, the object attributes being determined by the following steps:
for each recommendation list, computing for each object attribute, a probability of the object attribute occupying in one of the items in the recommendation list based on the received set of statistical latent class models, weighted with their respective probabilities of relevance, and weighted with prior object attribute weights;
sorting the object attributes in each recommendation list; and
returning at least a higher probability portion of a sorted list of object attributes with the recommendation list.

18. The method according to claim 16, further comprising:
recognizing that the user query is ambiguous based on the received set of statistical latent class models; and
when the user query is ambiguous, distributing the items over multiple recommendation lists.

19. The method according to claim 16, further comprising:
computing predictions of unobserved variables.

* * * * *